United States Patent
Rafii

(10) Patent No.: US 11,574,618 B2
(45) Date of Patent: Feb. 7, 2023

(54) METHODS AND APPARATUS FOR HARMONIC SOURCE ENHANCEMENT

(71) Applicant: Gracenote, Inc., Emeryville, CA (US)

(72) Inventor: Zafar Rafii, Berkley, CA (US)

(73) Assignee: Gracenote, Inc., Emeryville, CA (US)

(*) Notice: Subject to any disclaimer, the term of this patent is extended or adjusted under 35 U.S.C. 154(b) by 0 days.

(21) Appl. No.: 16/850,855

(22) Filed: Apr. 16, 2020

(65) Prior Publication Data

US 2021/0327400 A1 Oct. 21, 2021

(51) Int. Cl.
*H03G 5/00* (2006.01)
*H04R 1/32* (2006.01)
*G10K 11/175* (2006.01)
*G06F 3/16* (2006.01)
*G10L 25/18* (2013.01)

(52) U.S. Cl.
CPC ............ *G10K 11/175* (2013.01); *G06F 3/162* (2013.01); *G10L 25/18* (2013.01)

(58) Field of Classification Search
CPC .... G10L 21/14; G10L 25/18; G10H 2250/235
USPC ..................................................... 381/97–98
See application file for complete search history.

(56) References Cited

U.S. PATENT DOCUMENTS

| 5,948,468 A | * | 9/1999 | Sweatt | C23C 14/08 427/140 |
| 2011/0058685 A1 | * | 3/2011 | Sagayama | G10L 21/0272 381/98 |
| 2013/0322633 A1 | * | 12/2013 | Stone | H04N 21/812 381/2 |
| 2016/0078879 A1 | * | 3/2016 | Lu | G10L 25/81 381/56 |
| 2021/0134312 A1 | * | 5/2021 | Koishida | G06N 3/0454 |

OTHER PUBLICATIONS

Cano et al., "Phase-based Harmonic/Percussive Separation," INTERSPEECH 2014, Sep. 14-18, 2014, Singapore, pp. 1628-1632, 5 pages.
Muller, "Harmonic Percussive Souice Separation," International Audio Laboratories Erlangen, Friedrich-Alexander Universitat Erlangen-Numberg, Nov. 28, 2016, 13 pages.

* cited by examiner

*Primary Examiner* — George C Monikang
(74) *Attorney, Agent, or Firm* — McDonnell Boehnen Hulbert & Berghoff LLP

(57) ABSTRACT

Methods and apparatus for harmonic source enhancement are disclosed herein. An example apparatus includes an interface to receive a media signal. The example apparatus also includes a harmonic source enhancer to determine a magnitude spectrogram of audio corresponding to the media signal; generate a time-frequency mask based on the magnitude spectrogram; and apply the time-frequency mask to the magnitude spectrogram to enhance a harmonic source of the media signal.

21 Claims, 7 Drawing Sheets

METHODS AND APPARATUS FOR HARMONIC SOURCE ENHANCEMENT

FIELD OF THE DISCLOSURE

This disclosure relates generally to audio processing and, more particularly, to methods and apparatus for harmonic source enhancement.

BACKGROUND

Audio information (e.g., sounds, speech, music, etc.) can be represented as digital data (e.g., electronic, optical, etc.). Captured audio (e.g., via a microphone) can be digitized, stored electronically, processed and/or cataloged. One way of cataloging audio information is by generating an audio fingerprint. Audio fingerprints are digital summaries of audio information created by sampling a portion of the audio signal. Audio fingerprints have historically been used to identify audio and/or verify audio authenticity. In some examples, it is beneficial to separate an audio signal into harmonic and percussive components to help improve identifying audio and/or verifying audio authenticity.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
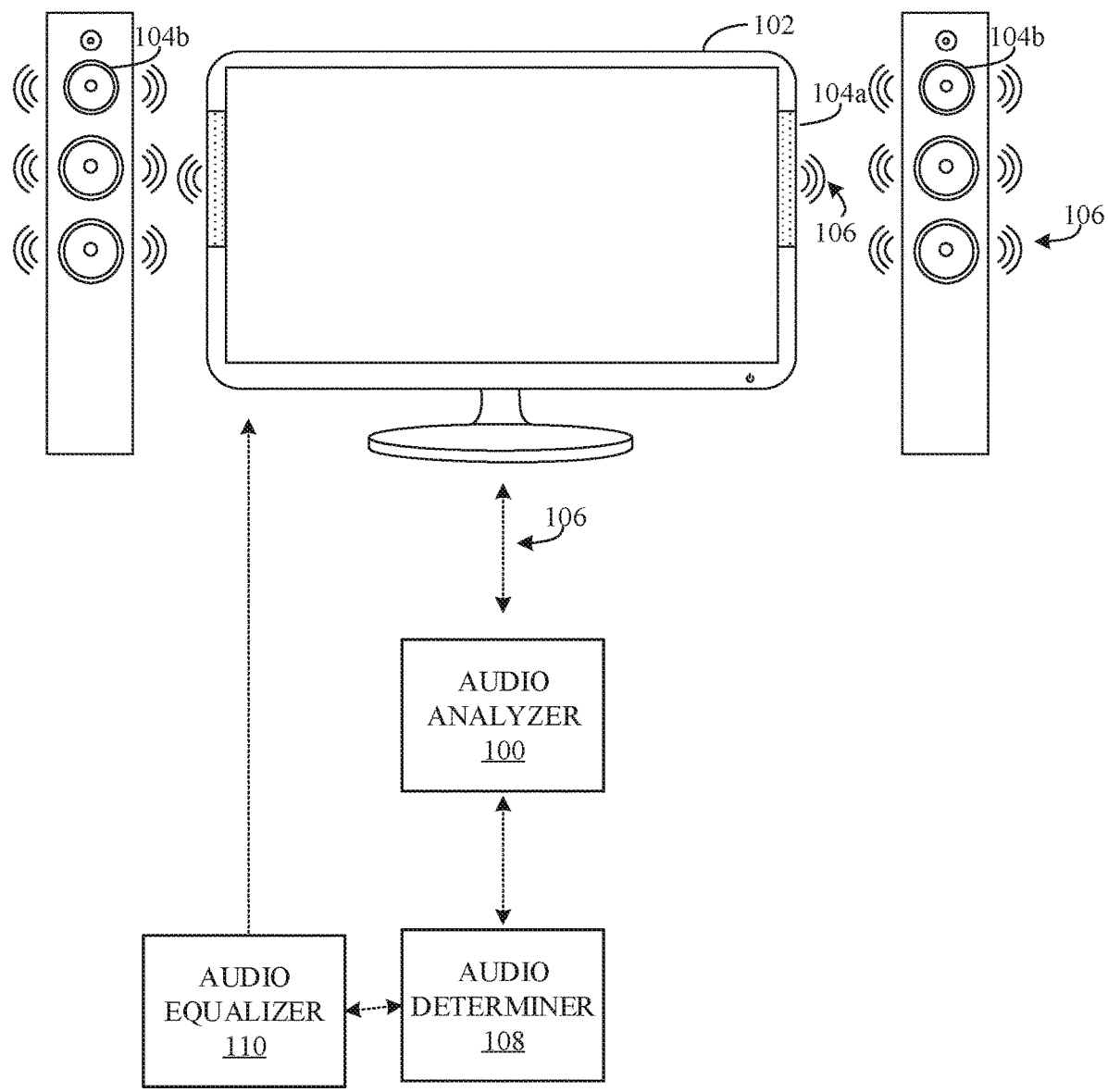
FIG. 1 is an illustration of an example system including and audio source and an example meter to enhance a harmonic source present in a media signal.

Audio signals are commonly a sinusoid (or sine wave) or combinations of sinusoids. A sinusoid is a mathematical curve having features including 1) an amplitude which corresponds to the peak deviation of the curve from zero, 2) a repeating pattern having a frequency corresponding to the number of complete cycles of the curve per unit time, and 3) a phase which corresponds to where in its cycle the curve begins. Audio signals are typically combinations of various sinusoids with different amplitudes, frequencies and phases.

Audio signals can broadly be categorized into two types of sources. For example, audio signals can be categorized into harmonic sources and percussive sources.

Harmonic sources correspond to pitched sound such as melodies and chords. In some examples, a violin can have a strong harmonic source, as well as a percussive source.

Percussive sources are noise-like and can correspond to instrument onsets (e.g., a hit on a drum, consonants in speech, etc.). In some examples, percussive sources may be the result of two colliding objects (e.g., a drum and drumstick). Percussive sources typically do not have a pitch, but correspond to a localization in time.

Many audio signals are a combination of harmonic and percussive sources. For example, a note played on a piano has a percussive source (e.g., the hammer hitting the piano strings) which results in a harmonic source (e.g., the vibrating piano string).

Harmonic source enhancement of audio signals focuses on enhancing harmonic (pitched) sources over percussive sources. In particular, harmonic source enhancement focuses on decomposing an input audio signal into a signal consisting of harmonic sources and a signal consisting of percussive sources, and/or enhancing harmonic sources present in the audio signal.

Harmonic source enhancement has numerous applications including remixing audio signals and audio identification and/or authentication. Harmonic source enhancement can also be utilized as a preprocessing tool for other tasks including automatic music transcription, chord estimation, and key signature detection. In these examples, the elimination and/or reduction of the percussive sources and emphasis on the harmonic sources allows improved estimation of pitched content.

As explained above, the enhanced harmonic source may be used to classify media and/or identify media and/or may be used as part of a signaturing algorithm. For example, the characteristic audio may be used to adjust audio settings of a media output device to provide a better audio experience for a user. For example, some audio equalizer settings may be better suited for audio from a particular instrument and/or genre. Accordingly, examples disclosed herein may adjust the audio equalizer settings of a media output device based on an identified instrument/genre corresponding to an enhanced harmonic source. In another example, harmonic source may be used to identify a media being output by a media presentation device (e.g., a television, computer, radio, smartphone, tablet, etc.) by comparing the enhanced harmonic source to reference harmonic sources in a database. In this manner, the enhanced harmonic source may be used to provide an audience measurement entity with more detailed media exposure information than conventional techniques.

In some examples, the enhanced harmonic source may be used to improve audio fingerprinting. For example, the enhanced harmonic source may be utilized to generate an audio fingerprint to help identify the audio signal in subsequent processing. For example, enhancing the harmonic source of an audio signal can mitigate background noise, thereby improving the audio signal. In some examples, enhancement of harmonic source of an audio signal can increase the efficiency and accuracy of audio identification systems and processes.

FIG. 1 illustrates an example audio analyzer 100 to enhance harmonic source present in a media signal. FIG. 1 includes the example audio analyzer 100, an example media output device 102, example speakers 104a, 104b, an example media signal 106, an example audio determiner 108, and an example audio equalizer 110.

The example audio analyzer 100 of FIG. 1 receives media signals from a device (e.g., the example media output device 102 and/or the example speakers 104a, 104b) and processes the media signal to determine a harmonic source. In some examples, the audio analyzer 100 may include, or otherwise be connected to, a microphone to receive the example media signal 106 by sensing ambient audio. In such examples, the audio analyzer 100 may be implemented in a meter or other computing device utilizing a microphone (e.g., a computer, a tablet, a smartphone, a smart watch, etc.). In some examples, the audio analyzer 100 includes an interface to receive the example media signal 106 directly (e.g., via a wired or wireless connection) from the example media output device 102 and/or a media presentation device presenting the media to the media output device 102. For example, the audio analyzer 100 may receive the media signal 106 directly from a set-top-box, a mobile phone, a gaming device, an audio receiver, a DVD player, a blue-ray player, a tablet, and/or any other devices that provides media to be output by the media output device 102 and/or the example speakers 104a, 104b.

As further described below in conjunction with FIG. 2, the example audio analyzer 100 enhances the harmonic source present in the media signal 106. If the media signal 106 is a video signal with an audio component, the audio analyzer 100 extracts the audio component from the media signal 106 prior to enhancing the harmonic source.

The example media output device 102 of FIG. 1 is a device that outputs media in the form of audio and/or video. Although the media output device 102 of FIG. 1 is illustrated as a television, the media output device 102 may be a radio, an MP3 player, a video game console, a stereo system, a mobile device, a tablet, a computing device, a tablet, a laptop, a projector, a DVD player, a set-top-box, an over-the-top device, and/or any device capable of outputting media (e.g., video and/or audio).

The example media output device 102 may include speakers 104a and/or may be coupled, or otherwise connected to portable speakers 104b via a wired or wireless connection. The example speakers 104a, 104b output the audio portion of the media output by the media output device 102. The media output device 102 may include a display through which visual media may be presented, or the media output device 102 may not include a display. In the illustrated example of FIG. 1, the media signal 106 represents audio that is output by the speakers 104a, 104b. Additionally or alternatively, the media signal 106 may be an audio signal and/or a video signal that is transmitted to the media output device 102 and/or the speakers 104a, 104b to be output by the media output device 102 and/or the speakers 104a, 104b. For example, the media signal 106 may be a signal from a gaming console that is transmitted to the media output device 102 and/or the speakers 104a, 104b to output audio and video of a video game. The example audio analyzer 100 may receive the media signal 106 directly from the media presentation device (e.g., the gaming console) and/or from the ambient audio. In this manner, the audio analyzer 100 may classify and/or identify audio from a media signal even when the speakers 104a, 104b are off, not working, or have audio that is turned down.

The example audio determiner 108 of FIG. 1 is in communication with the audio analyzer 100 and characterizes audio and/or identifies media based on a harmonic source measurement from the audio analyzer 100. For example, as described in further detail in connection with FIG. 2, the audio determiner 108 may include a database of reference harmonic sources corresponding to classifications and/or identifications. In this manner, the audio determiner 108 may compare received harmonic source(s) with the reference harmonic source to identify a match. If the audio determiner 108 identifies a match, the audio determiner 108 classifies the audio and/or identifies the media on information corresponding to the matched reference harmonic source. For example, if a received harmonic source matches a reference harmonic source corresponding to a particular audio signal (e.g., a song, a show, etc.), the audio determiner 108 classifies the audio corresponding to the received harmonic source as the particular audio signal, and or increases a count associated with measuring media exposure (e.g., increases a count associated with how many times the audio signal has been listened to). In such an example, if the audio analyzer 100 is part of a mobile phone, the audio analyzer 100 may receive the audio signal for the song (e.g., via an interface receiving the audio/video signal or via a microphone of the mobile phone receiving the audio signal). In this manner, the audio determiner 108 may identify that the received audio corresponds to the user (e.g., using a user interface of the mobile device). In another example, if a received harmonic source matches a reference harmonic source corresponding to a particular video game, the audio determiner 108 may identify the audio as being from the particular video game.

In some examples, the audio determiner 108 may include a database of reference audio signals (e.g., signatures) having enhanced harmonic sources (e.g., enhanced based on methods disclosed herein, enhanced based on other known methods) corresponding to classifications and/or identifications. In this manner, the audio determiner 108 may compare an audio signal with an enhanced harmonic source(s) with the reference audio signals with enhanced harmonic sources to identify a match. If the audio determiner 108 identifies a match, the audio determiner 108 classifies the audio and/or identifies the media on information corresponding to the matched reference audio signal with the enhanced harmonic source. For example, if a received audio signals with enhanced harmonic source matches a reference audio signal with an enhanced harmonic source corresponding to a particular audio signal (e.g., a song, a show, etc.), the audio determiner 108 classifies the audio corresponding to the received audio signal as the particular audio signal, and or increases a count associated with measuring media exposure (e.g., increases a count associated with how many times the audio signal has been listened to). In some examples, the audio determiner 108 may include a database of reference audio signals (e.g., signatures) that do not have enhanced harmonic sources corresponding to classifications and/or identifications. In this manner, the audio determiner 108 may compare an audio signal with an enhanced harmonic source(s) with the reference audio signals without enhanced harmonic sources to identify a match.

If the example audio determiner 108 identifies a match, the audio determiner 108 classifies the audio and/or identifies the media on information corresponding to the matched reference audio signal with the enhanced harmonic source. As such, the examples disclosed herein enhance the harmonic source of an audio signal to improve the accuracy and efficiency of audio identification systems and processes. For example, the examples disclosed herein enhance the harmonic source of a query audio signal to improve the accuracy of identifying a reference audio signal in an audio signal reference database. The audio determiner 108 may generate a report to identify the audio. In this manner, an audience measurement entity may credit exposure to the video game based on the report.

In some examples, the audio determiner 108 receives the enhanced harmonic source directly from the audio analyzer 100 (e.g., both the audio analyzer 100 and the audio determiner 108 are located in the same device). In some examples, the audio determiner 108 is located in a different location and receives the enhanced harmonic source from the audio analyzer 100 via a wireless communication.

In some examples, the audio determiner 108 transmits instructions to the audio media output device 102 and/or the audio analyzer 100 (e.g., when the audio analyzer 100 is implemented in the media output device 102) to adjust the audio equalizer settings of the audio equalizer 110 based on the audio classification. For example, if the audio determiner 108 classifies audio being output by the media output device 102 as being from a "Rock" genre, the audio determiner 108 may transmit instructions to adjust the audio equalizer settings of the audio equalizer 110 to settings that correspond to "Rock" audio. The audio determiner 108 is further described below in conjunction with FIG. 2.

Figure 2:
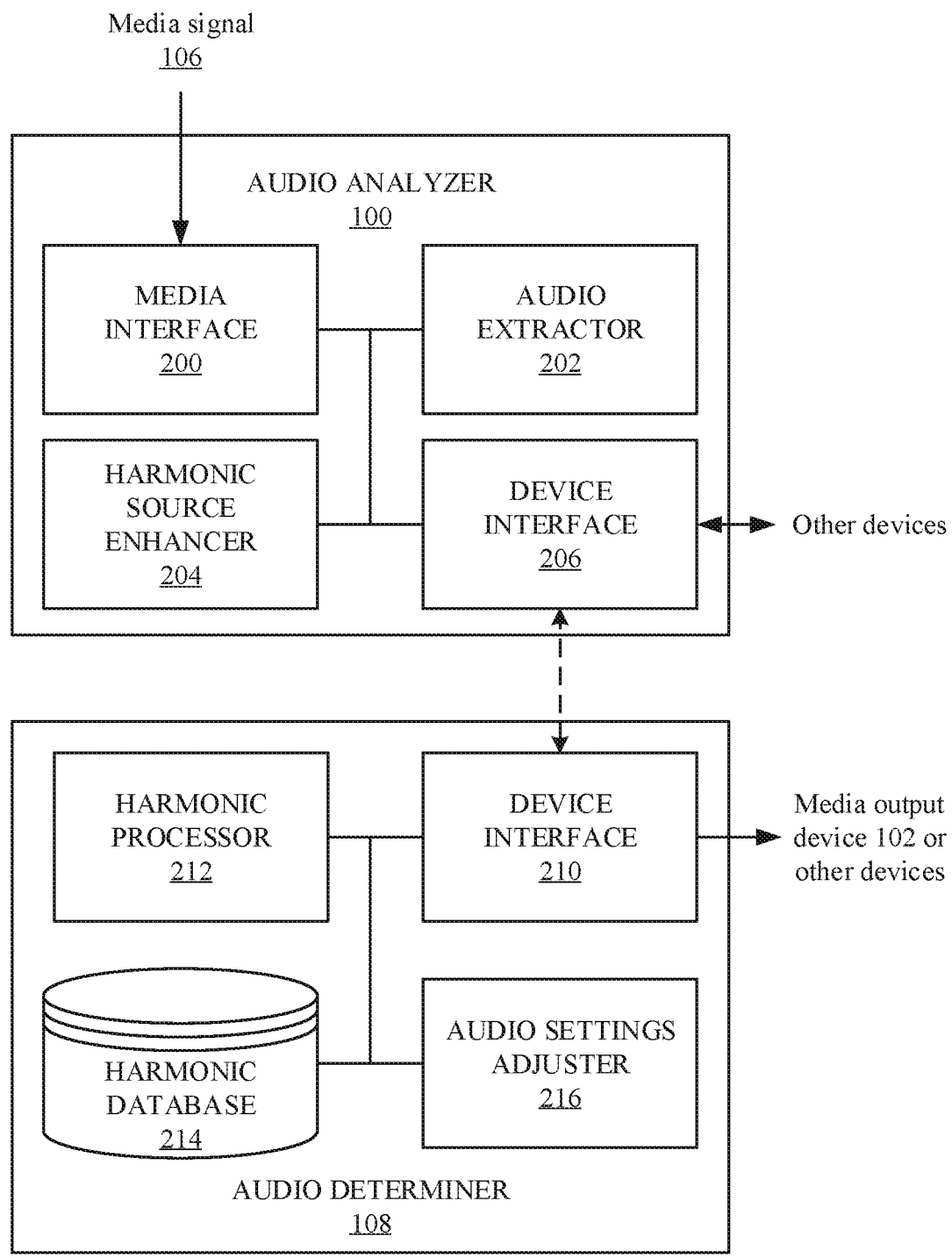
FIG. 2 is a block diagram of an example audio analyzer and an example audio determiner of FIG. 1.

FIG. 2 includes block diagrams of example implementations of the example audio analyzer 100 and the example audio determiner 108 of FIG. 1. The audio analyzer 100 of FIG. 2 includes an example media interface 200, an example audio extractor 202, an example harmonic source enhancer 204, and an example device interface 206. The audio determiner 108 of FIG. 2 includes an example device interface 210, an example harmonic processor 212, an example harmonic database 214, and an example audio settings adjuster 216. In some examples, elements of the audio analyzer 100 may be implemented in the audio determiner 108 and/or elements of the audio determiner 108 may be implemented in the audio analyzer 100.

The example media interface 200 of FIG. 2 receives (e.g., samples) the media signal 106 of FIG. 1. In some examples, the media interface 200 may be a microphone used to obtain the media signal 106 as audio by gathering the media signal 106 through the sensing of ambient audio. In some examples, the media interface 200 may be an interface to directly receive an audio and/or video signal (e.g., a digital representation of a media signal) that is to be output by the media output device 102. In some examples, the media interface 200 may include two interfaces: a microphone for detecting and sampling ambient audio and an interface to directly receive and/or sample an audio and/or video signal.

The example audio extractor 202 of FIG. 2 extracts audio from the received/sampled media signal 106. For example, the audio extractor 202 determines if a received media signal 106 corresponds to an audio signal or a video signal with an audio component. If the media signal corresponds to a video signal with an audio component, the audio extractor 202 extracts the audio component to generate the audio signal/samples for further processing.

The example harmonic source enhancer 204 of FIG. 2 processes the audio signal/samples to enhance a harmonic source of the audio signal/samples. For example, the harmonic source enhancer 204 determines a magnitude spectrogram for the audio signal. In some examples, the harmonic source enhancer 204 determines the magnitude spectrogram for the audio signal based on a band-pass filter, a Fourier transform, or a wavelet transform. In the illustrated example, the harmonic source enhancer 204 converts the audio signal into a time-frequency representation using a transform algorithm (e.g., Fourier transform, Constant Q transform, etc.), where each column of the time-frequency representation represents a spectrum at a particular instant in time. In some examples, the harmonic source enhancer determines the magnitude spectrogram 500 of FIG. 5A.

The harmonic source enhancer 204 of the illustrated example then determines the magnitude of the complex time-frequency representation of the time-frequency spectrum. In some examples, the harmonic source enhancer 204 of the illustrated example determines a Fourier transform of the magnitude spectrogram. For example, the harmonic source enhancer 204 determines the magnitude of every column of the time frequency representation. In this example, the harmonic source enhancer 204 determines the magnitude of every column 502 of the magnitude spectrogram 500 of FIG. 5A. The example harmonic source enhancer 204 of the illustrated example divides the Fourier transform by the absolute value of the Fourier transform. In some examples, the harmonic source enhancer 204 determines a Fourier transform of every column (e.g., each column 502 of the magnitude spectrogram 500 of FIG. 5A). The harmonic source enhancer 204 of the illustrated example then divides each column by the magnitude of that column. For example, the harmonic source enhancer 204 divides each column 502 of the magnitude spectrogram of FIG. 5A by the magnitude of the respective columns 502. The harmonic source enhancer 204 then generates the inverse Fourier transform for each column.

The harmonic source enhancer 204 of the illustrated example utilizes the output of the inverse Fourier transform to enhance the harmonic source. In some examples, the harmonic source enhancer 204 may generate a time-frequency mask and apply the time-frequency mask to a complex spectrogram of the audio signal to enhance the harmonic source of the audio signal. For example, the harmonic source enhancer 204 may generate the time frequency mask 504 illustrated in FIG. 5B. In this example, the output of the inverse Fourier transform may correspond to a violin. In some examples, the harmonic source enhancer 204 may apply the time-frequency mask 504 to the magnitude spectrogram 500 to determine the enhanced magnitude spectrogram 506 of FIG. 5C. In some examples, the enhanced magnitude spectrogram 506 of FIG. 5C represents the enhanced harmonic source. In some examples, the harmonic source enhancer 204 processes the enhanced magnitude spectrogram 506 of FIG. 5C to generate an audio signal representative of the enhanced harmonic source. The enhanced harmonic source may be utilized to identify the audio signal in subsequent processing. For example, the enhanced harmonic source corresponds to a particular piece of media (e.g., a song, a show, a movie, etc.). In some examples, the enhanced harmonic source may be stored in the harmonic database 214 to be used as a reference audio signature to identify subsequent audio signals. As used herein, "enhanced harmonic source" refers to an audio signal that has been processed in accordance with the teachings of this disclosure to emphasize the harmonics of the audio signal. For example, enhanced harmonic source refers to an audio signal that has emphasized harmonics to improve accuracy and efficiency of audio identification systems and processes.

In some examples, the harmonic source enhancer 204 may compute a magnitude spectrogram for the audio signal, determine a Fourier transform for each of the columns of the magnitude spectrogram, divide the resulting output by their respective magnitudes, and determine the inverse Fourier transform. In some examples, the harmonic source enhancer 204 generates a time-frequency mask which is applied to the audio signal to enhance the harmonic source. In such an example, the harmonic source enhancer 204 may utilize the time-frequency mask and apply the time-frequency mask to a complex spectrogram of the audio signal to enhance the harmonic source present in the audio signal.

In some examples, if the harmonic source enhancer 204 of FIG. 2 determines that resulting enhanced harmonic source is not satisfactory, the harmonic source enhancer 204 filters the results to improve the decomposition. For example, the harmonic source enhancer 204 may filter the results by emphasizing particular harmonics or by forcing a single peak/line and updating other components of the result. The example harmonic source enhancer 204 may filter once or may perform an iterative algorithm while updating the enhanced harmonic source at each iteration, thereby ensuring that the overall enhanced harmonic source result in the original audio. The harmonic source enhancer 204 may determine that the results are unsatisfactory based on user and/or manufacturer preferences.

The example device interface 206 of the audio analyzer 100 of FIG. 2 interfaces with the example audio determiner 108 and/or other devices (e.g., user interfaces, processing device, etc.). For example, when the harmonic source enhancer 204 determines the enhanced harmonic source, the example device interface 206 may transmit the enhanced harmonic source to the audio determiner 108 to classify the audio and/or identify media. In response, the device interface 206 may receive a classification and/or identification (e.g., an identifier corresponding to the source of the media signal 106) from the audio determiner 108 (e.g., in a signal or report). In such an example, the device interface 206 may transmit the classification and/or identification to other devices (e.g., a user interface) to display the classification and/or identification to a user. For example, if the audio analyzer 100 is being used in conjunction with a smart phone, the device interface 206 may output the results of the classification and/or identification to a user of the smartphone via an interface (e.g., screen) of the smartphone.

The example device interface 210 of the audio determiner 108 of FIG. 2 receives enhanced harmonic sources from the audio analyzer 100. Additionally, the device interface 210 outputs a signal/report representative of the classification and/or identification determined by the audio determiner 108. The report may be a signal that corresponds to the classification and/or identification based on the received enhanced harmonic source. In some examples, the device interface 210 transmits the report (e.g., including an identification of media corresponding to the harmonic source) to a processor (e.g., such as a processor of an audience measurement entity) for further processing. For example, the processor of the receiving device may process the report to generate media exposure metrics, audience measurement metrics, etc. In some examples, the device interface 210 transmits the report to the audio analyzer 100.

The example harmonic processor 212 of FIG. 2 processes the received enhanced harmonic source of the audio analyzer 100 to characterize the audio and/or identify the source of the audio. For example, the harmonic processor 212 may compare the received enhanced harmonic source to reference enhanced harmonic sources and/or reference audio signals that do not have enhanced harmonic sources in the example harmonic database 214. In this manner, if the harmonic processor 212 determines that the received enhanced harmonic source matches a reference harmonic source and/or reference audio signal, the harmonic processor 212 classifies and/or identifies a source of the audio based on data corresponding to the matched reference harmonic source and/or audio signal. For example, if the harmonic processor 212 determines that a received enhanced harmonic source matches a reference harmonic source that corresponds to a particular commercial, the harmonic processor 212 identifies the source of the audio to be the particular commercial. In some examples, the classification may include a genre classification. For example, if the harmonic processor 212 determines a number of instruments based on the enhanced harmonic source, the harmonic processor 212 may identify a genre of audio (e.g., classical, rock, hip hop, etc.) based on the identified instruments and/or based on the enhanced harmonic source itself. In some examples, when the harmonic processor 212 does not find a match, the harmonic processor 212 stores the received enhanced harmonic source in the harmonic database 214 to become a new reference harmonic source. If the harmonic processor 212 stores a new reference harmonic source in the harmonic database 214, the device interface 210 transmits instructions to the audio analyzer 100 to prompt a user for identification information (e.g., what is the classification of the audio, what is the source of the media, etc.). In this manner, if the audio analyzer 100 responds with additional information, the harmonic database 214 may store the additional information in conjunction with the new reference harmonic source. In some examples, a technician analyzes the new reference harmonic source to determine the additional information. The harmonic processor 212 generates a report based on the classification and/or identification.

The example audio settings adjuster 216 of FIG. 2 determines audio equalizer settings based on the classified audio for utilization by the audio equalizer 110. For example, if the classified audio corresponds to one or more instruments and/or a genre, the audio settings adjuster 216 may determine an audio equalizer setting corresponding to the one or more instruments and/or the genre and send instructions to the audio equalizer 110. In some examples, if the audio is classified as classical music, the audio setting adjuster 216 may select a classical audio equalizer setting (e.g., based on a level of bass, a level of tremble, etc.) corresponding to classical music and send instructions to the audio equalizer 110 in accordance with the classical music equalizer settings. In this manner, the device interface 210 may transmit the audio equalizer setting to the audio equalizer 110 to adjust the audio equalizer settings of the media output device 102.

While an example manner of implementing the example audio analyzer 100 and the example audio determiner 108 of FIG. 1 is illustrated in FIG. 2, one or more of the elements, processes and/or devices illustrated in FIG. 2 may be combined, divided, re-arranged, omitted, eliminated and/or implemented in any other way. Further, the example media interface 200, the example audio extractor 202, the example harmonic source enhancer 204, the example device interface 206, the example audio settings adjuster 216, and/or, more generally, the example audio analyzer 100 of FIG. 2 and/or the example device interface 210, the example harmonic processor 212, the example harmonic database 214, the example audio settings adjuster 216, and/or, more generally, the example audio determiner 108 of FIG. 2 may be implemented by hardware, software, firmware and/or any combination of hardware, software and/or firmware. Thus, for example, any of the example media interface 200, the example audio extractor 202, the example harmonic source enhancer 204, the example device interface 206, and/or, more generally, the example audio analyzer 100 of FIG. 2 and/or the example device interface 210, the example harmonic processor 212, the example harmonic database 214, the example audio settings adjuster 216, and/or, more generally, the example audio determiner 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media interface 200, the example audio extractor 202, the example harmonic source enhancer 204, the example device interface 206, and/or, more generally, the example audio analyzer 100 of FIG. 2 and/or the example device interface 210, the example harmonic processor 212, the example harmonic database 214, the example audio settings adjuster 216, and/or, more generally, the example audio determiner 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audio analyzer 100 and/or the example audio determiner 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
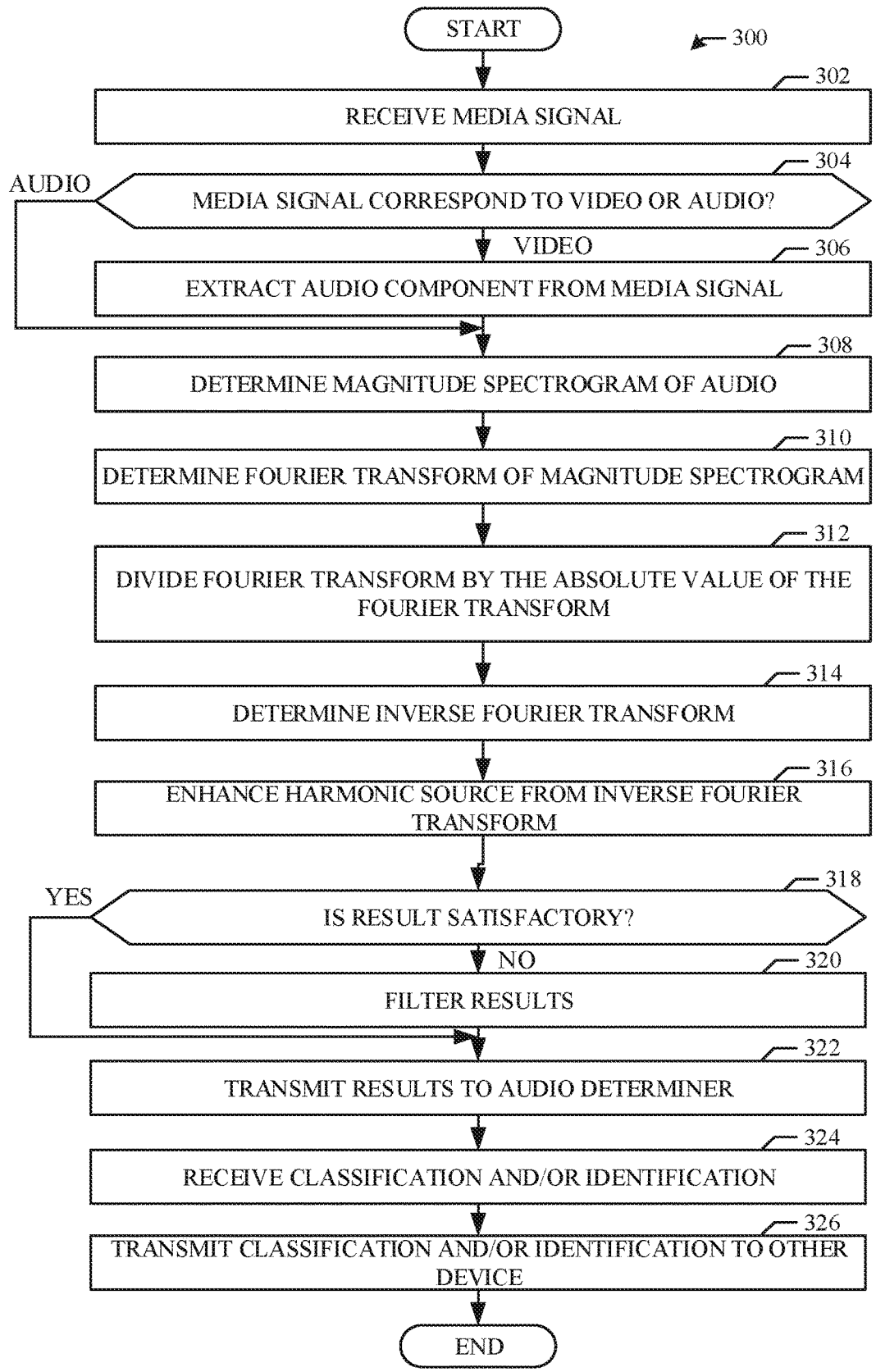
FIG. 3 is a flowchart representative of example machine readable instructions that may be executed to implement the example audio analyzer of FIGS. 1 and 2 to enhance a harmonic source present in a media signal.
Figure 4:
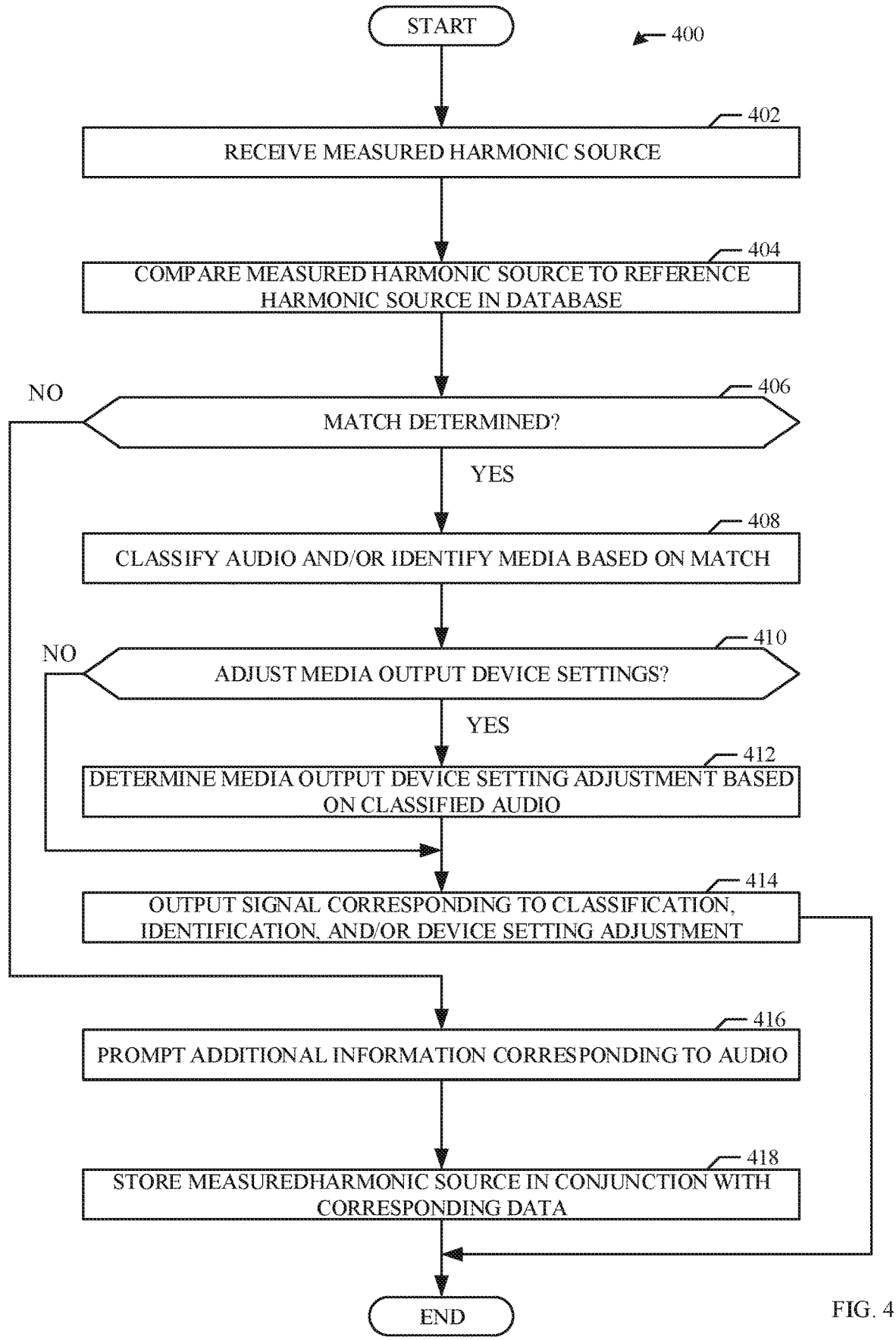
FIG. 4 is a flowchart representative of example machine readable instructions that may be executed to implement the example audio determiner of FIGS. 1 and 2 to characterize audio and/or identify media based on a harmonic source.

A flowchart representative of example hardware logic or machine readable instructions for implementing the audio analyzer 100 of FIG. 2 is shown in FIG. 3 and a flowchart representative of example hardware logic or machine readable instructions for implementing the audio determiner 108 of FIG. 2 is shown in FIG. 4. The machine readable instructions may be a program or portion of a program for execution by a processor such as the processor 612, 712 shown in the example processor platform 600, 700 discussed below in connection with FIGS. 6 and/or 7. The program may be embodied in software stored on a non-transitory computer readable storage medium such as a CD-ROM, a floppy disk, a hard drive, a DVD, a Blu-ray disk, or a memory associated with the processor 612, 712, but the entire program and/or parts thereof could alternatively be executed by a device other than the processor 612, 712 and/or embodied in firmware or dedicated hardware. Further, although the example program is described with reference to the flowcharts illustrated in FIGS. 3-4, many other methods of implementing the example audio analyzer 100 and/or the example audio determiner 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 3 is an example flowchart 300 representative of example machine readable instructions that may be executed by the example audio analyzer 100 of FIGS. 1 and 2 to cause the audio analyzer 100 to enhance harmonic source present in a media signal (e.g., an audio signal of a media signal). Although the instructions of FIG. 3 are described in conjunction with the example audio analyzer 100 of FIG. 1, the example instructions may be used by an audio analyzer in any environment.

At block 302, the example media interface 200 receives one or more media signals or samples of media signals (e.g., the example media signal 106). As described above, the example media interface 200 may receive the media signal 106 directly (e.g., as a signal to/from the media output device 102) or indirectly (e.g., as a microphone detecting the media signal by sensing ambient audio). At block 304, the example audio extractor 202 determines if the media signal correspond to video or audio. For example, if the media signal was received using a microphone, the audio extractor 202 determines that the media corresponds to audio. However, if the media signal is received signal, the audio extractor 202 processes the received media signal to determine if the media signal corresponds to audio or video with an audio component. If the example audio extractor 202 determines that the media signal corresponds to audio (block 304: AUDIO), the process continues to block 308. If the example audio extractor 202 determines that the media signal corresponds to video (block 306: VIDEO), the example audio extractor 202 extracts the audio component from the media signal (block 306).

At block 308, the example harmonic source enhancer 204 determines the magnitude spectrogram of the audio signal. For example, the harmonic source enhancer 204 may determine the magnitude spectrogram (e.g., magnitude spectrogram 500 of FIG. 5A) of the audio signal by performing a known magnitude spectrogram technique. At block 310, the example harmonic source enhancer 204 determines the Fourier transform (FT) of the magnitude spectrogram. For example, the harmonic source enhancer 204 performs a FT to the magnitude spectrogram. At block 312, the example harmonic source enhancer 204 divides the Fourier transform by the absolute value of the Fourier transform. At block 314, the example harmonic source enhancer 204 determines the inverse Fourier transform. For example, the audio analyzer determines the inverse of the Fourier transform from block 312. At block 316, the example harmonic source enhancer 204 enhances the harmonic source from the inverse Fourier transform. For example, the harmonic source enhancer 204 may generate a time-frequency mask (e.g., time-frequency mask 504 of FIG. 5B) and apply it to the audio signal and/or the magnitude spectrogram to enhance the harmonic source present in the audio signal.

At block 318, the example harmonic source enhancer 204 determines if the result(s) (e.g., the determined harmonic source) is satisfactory. As described above in conjunction with FIG. 2, the example harmonic source enhancer 204 determines that the result(s) are satisfactory based on user and/or manufacturer result preferences. If the example harmonic source enhancer 204 determines that the results are satisfactory (block 318: YES), the process continues to block 322. If the example harmonic source enhancer 204 determines that the results are satisfactory (block 318: NO), the example harmonic source enhancer 204 filters the results (block 320). As described above in conjunction with FIG. 2, the example harmonic source enhancer 204 may filter the results by emphasizing harmonics or forcing a single peak/line (e.g., once or iteratively).

At block 322, the example device interface 206 transmits the results to the example audio determiner 108. At block 324, the example harmonic source enhancer 204 receives a classification and/or identification data corresponding to the audio signal. Alternatively, if the audio determiner 108 was not able to match the enhanced harmonic source of the audio signal to a reference, the device interface 206 may transmit instructions for additional data corresponding to the audio signal. In such examples, the device interface 206 may transmit prompt to a user interface for a user to provide the additional data. Accordingly, the example device interface 206 may provide the additional data to the example audio determiner 108 to generate a new reference harmonic source. At block 326, the example harmonic source enhancer 204 transmits the classification and/or identification to other connected devices. For example, the harmonic source enhancer 204 may transmit a classification to a user interface to provide the classification to a user.

FIG. 4 is an example flowchart 400 representative of example machine readable instructions that may be executed by the example audio determiner 108 of FIGS. 1 and 2 to cause the audio determiner 108 classify audio and/or identify media based on harmonic source of audio. Although the instructions of FIG. 4 are described in conjunction with the example audio determiner 108 of FIG. 1, the example instructions may be used by an audio determiner in any environment.

At block 402, the example device interface 210 receives a measured (e.g., determined or enhanced) harmonic source from the example audio analyzer 100. At block 404, the example harmonic processor 212 compares the measured enhanced harmonic source to the reference harmonic sources in the example harmonic database 214. At block 406, the example harmonic processor 212 determines if a match is found between the received enhanced harmonic source and the reference harmonic sources. If the example harmonic processor 212 determines that a match is determined (block 406: YES), the example harmonic processor 212 classifies the audio (e.g., identifying instruments and/or genres) and/or identifies media corresponding to the audio based on the match (block 408) using additional data stored in the example harmonic database 214 corresponding to the matched reference harmonic source.

At block 410, the example audio settings adjuster 216 determines whether the audio settings of the media output device 102 can be adjusted. For example, there may be an enabled setting to allow the audio settings of the media output device 102 to be adjusted based on a classification of the audio being output by the example media output device 102. If the example audio settings adjuster 216 determines that the audio settings of the media output device 102 are not to be adjusted (block 410: NO), the process continues to block 414. If the example audio settings adjuster 216 determines that the audio settings of the media output device 102 are to be adjusted (block 410: YES), the example audio settings adjuster 216 determines a media output device setting adjustment based on the classified audio. For example, the example audio settings adjuster 216 may select an audio equalizer setting based on one or more identified instruments and/or an identified genre (e.g., from the harmonic source or based on the identified instruments) (block 412). At block 414, the example device interface 210 outputs a report corresponding to the classification, identification, and/or media output device setting adjustment. In some examples the device interface 210 outputs the report to another device for further processing/analysis. In some examples, the device interface 210 outputs the report to the example audio analyzer 100 to display the results to a user via a user interface. In some examples, the device interface 210 outputs the report to the example audio equalizer 110 to adjust the audio settings of the media output device 102.

If the example harmonic processor 212 determines that a match is not determined (block 406: NO), the example device interface 210 prompts for additional information corresponding to the audio signal (block 416). For example, the device interface 210 may transmit instructions to the example audio analyzer 100 to (A) prompt a user to provide information corresponding to the audio or (B) prompt the audio analyzer 100 to reply with the full audio signal. At block 418, the example harmonic database 214 stores the measured harmonic source in conjunction with corresponding data that may have been received.

Figure 5A:
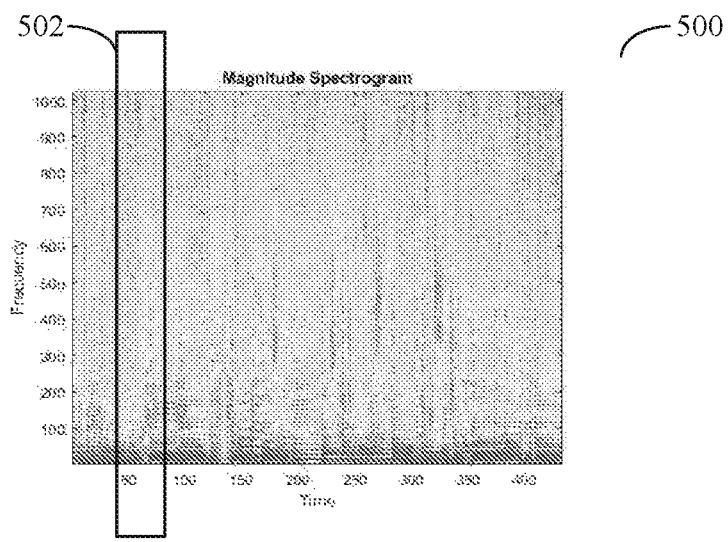
FIGS. 5A-5C illustrate an example magnitude spectrogram, an example time-frequency mask, and an example enhanced magnitude spectrogram in accordance with the teachings of this disclosure.
Figure 5B:
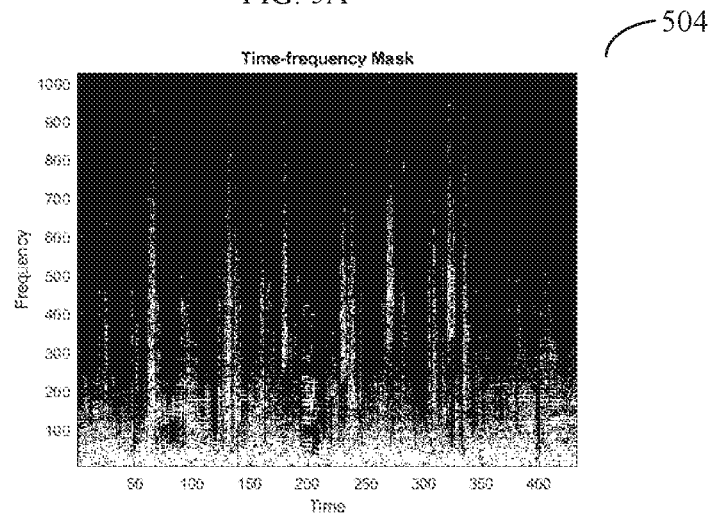
Figure 5C:
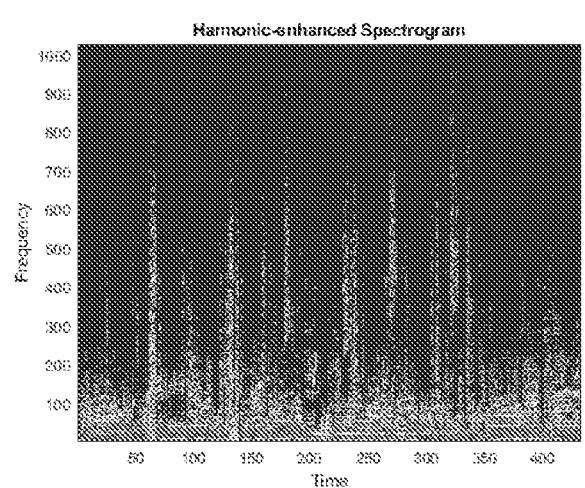

FIGS. 5A-5C illustrate the example magnitude spectrogram 500, the example time-frequency mask 504, and the example enhanced magnitude spectrogram 506. FIG. 5A illustrates the example magnitude spectrogram 500 including columns 502 that may be generated by the harmonic source enhancer 204 in accordance with the methods disclosed in connection with FIG. 2. FIG. 5B illustrates the example time-frequency mask 504 that may be generated by the harmonic source enhancer 204 in accordance with the methods disclosed in connection with FIG. 2. FIG. 5C illustrates the example enhanced magnitude spectrogram 506 that may be generated by the harmonic source enhancer 204 in accordance with the methods disclosed in connection with FIG. 2. The enhanced magnitude spectrogram 506 is the result of applying the time-frequency mask 504 to the magnitude spectrogram 500. As shown in the illustrated enhanced magnitude spectrogram 506 of FIG. 5C, various portions of the magnitude spectrogram 500 have been masked by the time-frequency mask 504, thereby enhancing the harmonics of the magnitude spectrogram 500 and generating an enhanced harmonic source.

Figure 6:
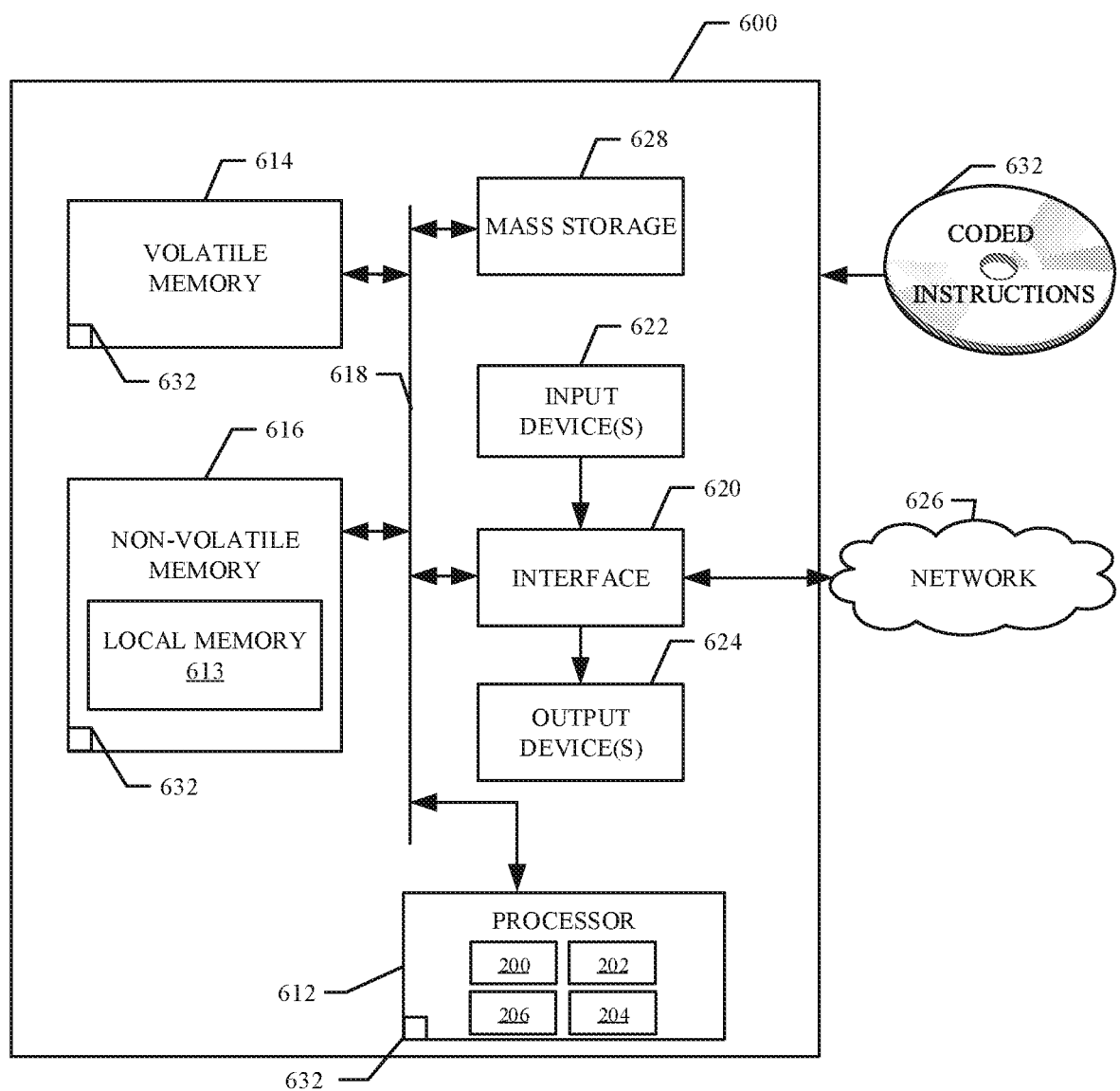
FIG. 6 is a block diagram of a processor platform structured to execute the example machine readable instructions of FIG. 3 to implement the example audio analyzer of FIGS. 1 and 2.

FIG. 6 is a block diagram of an example processor platform 600 structured to execute the instructions of FIG. 3 to implement the audio analyzer 100 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media interface 200, the example audio extractor 202, the example harmonic source enhancer 204, and/or the example device interface of FIG. 2

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 3 may be stored in the mass storage device 628, in the volatile memory 614, in the non-volatile memory 616, and/or on a removable non-transitory computer readable storage medium such as a CD or DVD.

Figure 7:
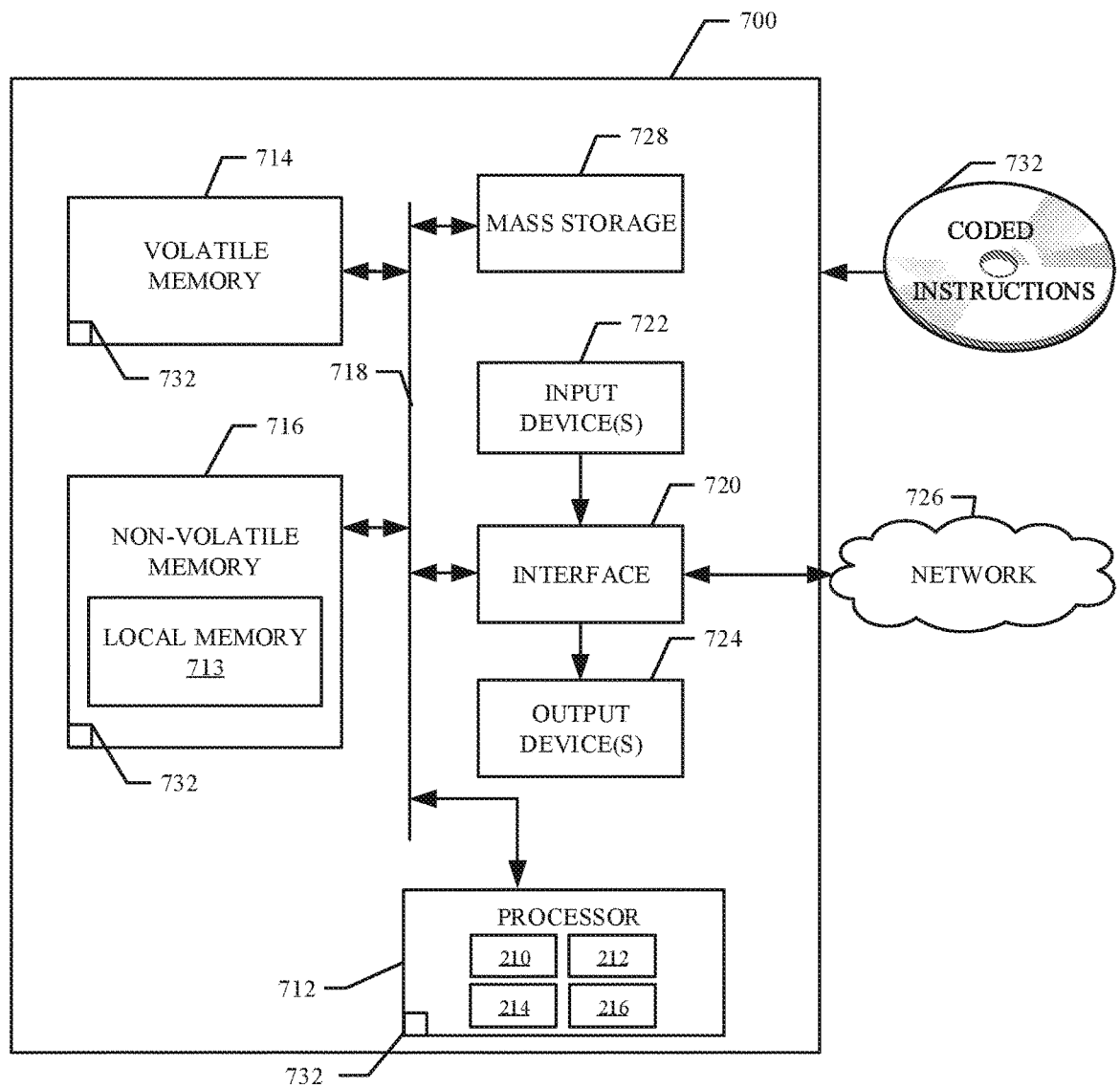
FIG. 7 is a block diagram of a processor platform structured to execute the example machine readable instructions of FIG. 4 to implement the example audio determiner of FIGS. 1 and 2.

FIG. 7 is a block diagram of an example processor platform 700 structured to execute the instructions of FIG. 4 to implement the audio determiner 108 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example device interface 210, the example harmonic processor 212, the example harmonic database 214, and/or the example audio settings adjuster 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 4 may be stored in the mass storage device 728, in the volatile memory 714, in the non-volatile memory 716, and/or on a removable non-transitory computer readable storage medium such as a CD or DVD.

From the foregoing, it would be appreciated that the above disclosed method, apparatus, and articles of manufacture enhance harmonic source present in a media signal. Examples disclosed herein determine a harmonic source based on audio received directly or indirectly from a media output device. Example disclosed herein further include classifying the audio based on the enhanced harmonic source and/or identifying a media source (e.g., a song, a video game, an advertisement, etc.) of the audio based on the enhanced harmonic source. Using examples disclosed herein, enhanced harmonic source can be used to classify and/or identify audio with significantly less resources then conventional techniques. Additionally, examples disclosed herein can be used to identify a pitch, separate out an instrument from audio, and/or improve fingerprinting audio. Accordingly, examples disclosed herein are directed to improvements in a computing device and to improvements to the field of audio processing (e.g., fingerprinting, audio identification, etc.).

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A system comprising:
an audio analyzer to:
determine a magnitude spectrogram of audio corresponding to a media signal;
generate a time-frequency mask based on the magnitude spectrogram; and
apply the time-frequency mask to the magnitude spectrogram to enhance a harmonic source of the media signal; and
an audio determiner to:
compare the media signal having the enhanced harmonic source with reference media signals to determine an instrument corresponding to the enhanced harmonic source; and
identify a genre corresponding to the media signal based on the identified instrument.

2. The system of claim 1, wherein the audio analyzer determines the magnitude spectrogram by transforming the audio into a time-frequency representation using at least one of a Fourier transform, or a Constant Q transform.

3. The system of claim 2, wherein the time-frequency representation includes respective columns corresponding to a spectrum at a particular instant.

4. The system of claim 3, wherein the audio analyzer determines a Fourier transform at each of the respective columns.

5. The system of claim 4, wherein the audio analyzer generates an inverse Fourier transform for each of the respective columns.

6. The system of claim 5, wherein the audio analyzer divides the Fourier transform by an absolute value of the Fourier transform.

7. The system of claim 1, wherein the system further comprises an audio analyzer to:
transmit the enhanced harmonic source to the audio determiner; and
obtain at least one of a classification of the audio or an identifier corresponding to the media signal from the audio determiner.

8. The system of claim 1, wherein the audio determiner determines audio equalizer settings for the media based on classification, further including an audio equalizer to adjust equalizer settings of a media output device that output the media based on the determined audio equalizer settings.

9. The system of claim 1, wherein the harmonic source is a first harmonic source, the audio determiner identifies the genre of the media based on comparison with a second harmonic source of the reference media signals.

10. A non-transitory computer readable medium comprising instructions that, when executed, cause one or more processors to at least:
determine a magnitude spectrogram of audio corresponding to a media signal;
generate a time-frequency mask based on the magnitude spectrogram;
apply the time-frequency mask to the magnitude spectrogram to enhance a harmonic source of the media signal;
compare the media signal having the enhanced harmonic source with reference media signals to determine an instrument corresponding to the enhanced harmonic source; and
identify a genre corresponding to the media signal based on the identified instrument.

11. The non-transitory computer readable medium of claim 10, wherein the instructions further cause the one or more processors to transform the audio into a time-frequency representation using at least one of a Fourier transform, or a Constant Q transform.

12. The non-transitory computer readable medium of claim 11, wherein the time-frequency representation includes respective columns corresponding to a spectrum at a particular instant.

13. The non-transitory computer readable medium of claim 12, wherein the instructions further cause the one or more processors to determine a Fourier transform at each of the respective columns.

14. The non-transitory computer readable medium of claim 13, wherein the instructions further cause the one or more processors to generate an inverse Fourier transform for each of the respective columns.

15. The non-transitory computer readable medium of claim 14, wherein the instructions further cause the one or more processors to divide the Fourier transform by an absolute value of the Fourier transform.

16. A method comprising:
   determining, by executing an instruction with one or more processors, a magnitude spectrogram of audio corresponding to a media signal;
   generating, by executing an instruction with the one or more processors, a time-frequency mask based on the magnitude spectrogram;
   applying, by executing an instruction with the one or more processors, the time-frequency mask to the magnitude spectrogram to enhance a harmonic source of the media signal;
   comparing, by executing an instruction with the one or more processors, the media signal having the enhanced harmonic source with reference media signals to determine an instrument corresponding to the enhanced harmonic source; and
   classifying, by executing an instruction with the one or more processors, a genre corresponding to the media signal based on the identified instrument.

17. The method of claim 16, further including transforming the audio into a time-frequency representation using at least one of a Fourier transform, or a Constant Q transform, the time-frequency representation includes respective columns corresponding to a spectrum at a particular instant.

18. The method of claim 17, further including determining a Fourier transform at each of the respective columns.

19. The method of claim 18, further including generating an inverse Fourier transform for each of the respective columns.

20. The method of claim 19, further including dividing the Fourier transform by an absolute value of the Fourier transform.

21. A system comprising:
   at least one memory;
   instructions; and
   one or more processors to execute the instructions to:
      determine a magnitude spectrogram of audio corresponding to a media signal;
      generate a time-frequency mask based on the magnitude spectrogram;
      apply the time-frequency mask to the magnitude spectrogram to enhance a harmonic source of the media signal;
      compare the media signal having the enhanced harmonic source with reference media signals to determine an instrument corresponding to the enhanced harmonic source; and
      identify at least one of a song, an advertisement, a show, or a video game based on the identified instrument.

* * * * *